Feb. 7, 1956
A. I. MENDOLIA
2,733,981
SALT RECOVERY PROCESS
Filed Jan. 16, 1953
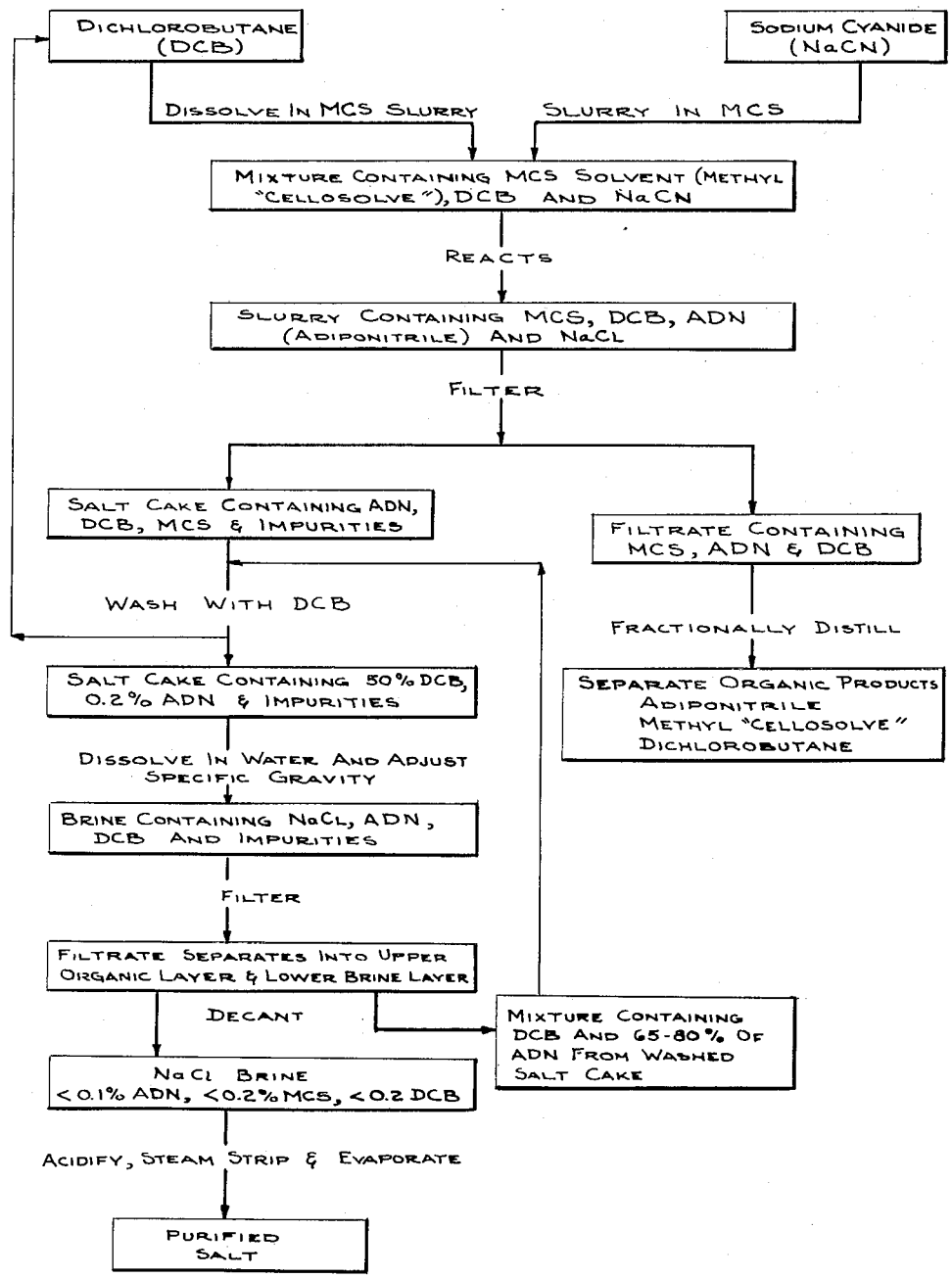
INVENTOR.
ARTHUR I. MENDOLIA
BY James H. Ryan
ATTORNEY

United States Patent Office 2,733,981
Patented Feb. 7, 1956

2,733,981

SALT RECOVERY PROCESS

Arthur I. Mendolia, Lewiston, N. Y., assignor to E. I. du Pont de Nemours and Company, Wilmington, Del., a corporation of Delaware Application January 16, 1953, Serial No. 331,604

7 Claims. (Cl. 23—25)

This invention relates to the recovery of salt from solutions containing both sodium chloride and organic materials.

One of the products of reactions between sodium cyanide and chlorinated compounds to produce nitriles is common salt. Although this material is relatively inexpensive, particularly in comparison with the organic compounds also involved in the reactions, it is generally recovered from the products and when purified affords some economies in the over-all procedure. Perhaps of more actual value than the salt itself are the organic compounds carried down with it. Unless they are recovered and the salt purified at least incidentally, considerable impairment in the efficiency of the system will result.

Rogers, U. S. P. 2,415,261, discloses a method whereby the cyanation of an organic halide is carried out in an ether or alcohol. In practice the by-product salt from such a reaction is filtered from the reaction mixture and treated further for purification while the mixed solvent and organic products are separated by conventional methods such as fractional distillation. The Rogers process is particularly adapted to the production of adiponitrile according to the equation:

$$ClCH_2CH_2CH_2CH_2Cl + 2NaCN \rightarrow$$
$$CNCH_2CH_2CH_2CH_2CN + 2NaCl$$
Dichlorobutane        Adiponitrile Solvents for this reaction may include methyl "Cellosolve" or methoxyethanol, an ether-alcohol of the type discussed by Rogers, or any other suitable organic liquid.

The salt precipitated out from the reactants shown above has heretofore been purified by a tedious and costly procedure that wasted much organic matter. The salt in the form of a cake was first washed with dichlorobutane to remove part of the occluded adiponitrile. Despite the wash, up to 1.5–2.0% of the entire nitrile yield might remain in the salt cake together with perhaps 30–50% dichlorobutane. The cake was then dissolved to form a nearly saturated brine, acidified with hydrochloric acid and steam-stripped to remove hydrogen cyanide and the organic chlorine compounds. The partially purified brine was finally evaporated to salt contaminated with an undue proportion of valuable adiponitrile.

The process outlined above suffered from several obvious disadvantages. In the first place the steam required to evaporate all the dichlorobutane remaining in the salt cake and carried into the brine constituted a large item of expense. In the second place steam-stripping alone cannot recover adiponitrile. Consequently a large amount of this valuable material remained in the brine to contaminate the salt finally recovered. Finally, the loss of adiponitrile was increased by reaction induced between dichlorobutane and residual sodium cyanide in the salt cake by the high temperature necessary for the steam-stripping. These several factors combined to render the process used heretofore quite inefficient.

A primary object of the present invention is, consequently, development of a novel and useful process for the recovery of salt from brines.

Another object is development of a process for recovering salt and valuable organic compounds from salt brines containing such compounds.

Another object is development of a process for separating dichlorobutane from salt brines without the use of an expensive steam-stripping step.

A further object is production of a method for separating adiponitrile from salt brines in improved yields.

An additional object of the invention is provision of a method for preparing usable brines from sodium chloride containing certain impurities.

Still further objects will be evident from the remainder of this specification and from the drawing, in which:

The figure is a flow diagram of a process for making salt and adiponitrile from sodium cyanide and dichlorobutane including the modifications of this invention. In this flow diagram the blocks generally represent compositions undergoing chemical and physical changes indicated by the arrow heads and the wording on the flow lines. The darker flow lines indicate the main course of the reaction while the lighter designate recycling steps. The figures given for composition in the figure are only approximate and may vary greatly in practice.

The process shown in the diagram proceeds in the customary manner until the step of washing the salt cake with dichlorobutane is reached. At this point the procedure is altered so that some of the washing is carried out with material enriched in adiponitrile by the methods of this invention and recycled. Wash dichlorobutane is then recycled as solvent according to the usual procedure. The washed salt-cake, containing about 30–50% dichlorobutane, is dissolved in water to form a nearly saturated brine. Contrary to usual practice, however, the specific gravity of this brine must be carefully adjusted to a predetermined value for a purpose which will be evident shortly. For best results this value should lie between about 1.16 and 1.19 at 25° C.

The brine when adjusted to the proper specific gravity is a turbid liquid containing no obviously solid particles. In fact, it is essential for effective operation that sufficient water be added that all the salt be dissolved. Hence the specific gravity should not be above about 1.20, the specific gravity of saturated brine. Theoretically dichlorobutane, which constitutes a major proportion of this brine, and water are substantially immiscible. The water and the organic materials should therefore separate into distinct fractions. Heretofore, this has not been found to be the case. This brine does not resolve itself into its liquid components merely on standing. The expensive steam-stripping procedure referred to above was, as a result, necessitated.

The basis of this invention is the unexpected discovery that if salt-dichlorobutane brine of the preferred 1.16–1.19 specific gravity be filtered and then allowed to stand for a reasonable time, one hour generally being sufficient, a definite liquid interface is established between an upper organic layer and a lower brine layer. When this interface appears, the constituents of the mixture can easily be separated completely by decantation. Since adiponitrile is appreciably more soluble in dichlorobutane than in brine, a partition coefficient exists which favors recovery of the larger fraction of the nitrile in the organic layer. The brine layer after decantation contains almost all the sodium chloride produced together with some unreacted cyanide. The brine is thus acidified and steam-stripped to remove hydrogen cyanide and evaporated to recover the salt. The cyanide gas is generally burned as a safety precaution.

Additional details of the process of this invention may be found in the following examples:

EXAMPLE I

This example shows the results obtained from a series of runs carried out by the procedure of this invention.

A salt cake resulting from the reaction between dichlorobutane and sodium cyanide in methyl "Cellosolve" to give adiponitrile was dissolved in water to form several separate samples of a specific gravity around 1.16. The initial analysis of this salt cake was, by weight:

| | Percent |
|---|---|
| Dichlorobutane | 31.46 |
| Adiponitrile | 1.46 |
| Methyl "Cellosolve" | 1.26 |
| Sodium cyanide | 1.77 |
| Sodium chloride | 64.24 |

The samples were then filtered through a nylon cloth (Wellington Sears 385), the preferred filter medium, coated with a filter aid ("Celite" 545). After filtration the samples were allowed to stand for periods ranging between 37 and 75 minutes. At the end of this time two discrete layers were observable in each sample. The layers were separated from each other and analyzed. Data on the upper organic layer are presented in Table I while data on the final brine layer is given in Table II.

*Table I.—Data for organic layer*

| Sample | 1 | 2 | 3 | 4 | 5 | 6 |
|---|---|---|---|---|---|---|
| Volume Percent | 12 | 12 | 13 | 13 | 13 | 13 |
| Specific Gravity | 1.13 | 1.128 | | | | |
| Dichlorobutane | 89.64 | 87.04 | 83.65 | 88.64 | 87.21 | 83.87 |
| Adiponitrile | 0.61 | 0.67 | 0.97 | 0.84 | 0.76 | 0.89 |
| Methyl "Cellosolve" | 0.52 | 1.12 | 0.58 | 0.59 | 0.52 | 0.54 |
| Water | 0.29 | 0.23 | 0.13 | 0.15 | 0.13 | 0.11 |
| Sodium Chloride | 0.024 | | 0.04 | 0.09 | 0.06 | 0.09 |

*Table II.—Data for brine layer*

| Sample | 1 | 2 | 3 | 4 | 5 | 6 |
|---|---|---|---|---|---|---|
| Volume Percent | 88 | 88 | 87 | 87 | 87 | 87 |
| Specific Gravity | 1.165 | 1.192 | 1.158 | 1.163 | 1.177 | 1.162 |
| Dichlorobutane | 0.10 | 0.10 | 0.143 | 0.025 | 0.025 | 0.007 |
| Adiponitrile | 0.07 | 0.07 | 0.07 | 0.08 | 0.016 | 0.06 |
| Methyl "Cellosolve" | 2.44 | 0.26 | 3.42 | 3.5 | 2.8 | 3.1 |
| Sodium Chloride | 21.17 | 23.16 | 19.86 | 20.72 | 21.85 | 20.32 |

It will be evident from the tables above that separation of brine and dichlorobutane as carried out by the procedure of this invention is substantially complete. Adiponitrile likewise is largely removed by the decantation. Some of the methyl "Cellosolve" however comes through into the brine where sodium cyanide is always present. The brine must therefore be acidified with hydrochloric acid and steam-stripped. These procedures remove cyanide and low boiling organic compounds and result in a purified brine. Any mineral acid may be used for the acidification step but, since hydrochloric acid introduces no new radicals, it is preferred. The purified brine is evaporated to form salt of a purity greater than has been attained heretofore from the cyanation of dichlorobutane while the separated organic layer is recirculated as a wash to the original salt cake and mixed with fresh dichlorobutane to pass again through the system.

EXAMPLE II

This example shows the results of a series of experiments made to determine the effect of the specific gravity of the initial brine solution on filterability.

1000 cc. samples were formed as in the previous example by dissolving salt cake in water and were filtered under vacuum in a Buchner funnel. Nylon filter cloth (Wellington Sears 385) precoated with 30 g. "Celite" 545 filter aid was again the chosen filter medium. Filtration results are recorded in Table III.

*Table III.—Effect of specific gravity on filtration*

| Sample | Specific Gravity | Filtration time (Seconds) | Remarks |
|---|---|---|---|
| 1 | 1.184 | 90 | Undissolved salt on cake. Decantation good. |
| 2 | 1.174 | 70 | Undissolved salt on cake. Decantation good. |
| 3 | 1.160 | 35 | Decantation not as good as above. |
| 4 | 1.150 | 45 | Decantation slow. |
| 5 | 1.130 | 55 | Decantation slow and incomplete. |
| 6 | 1.100 | 70 | Decantation very slow and incomplete. Dichlorobutane on bottom. |
| 7 | 1.080 | 90 | Decantation fair. Dichlorobutane on bottom. |

These experiments make clear the importance of controlling the specific gravity in this process. The two factors of major importance in securing effective separation of dichlorobutane from brine according to the practice of this invention are the specific gravity and the temperature of the filtered liquid. It is necessary, on the one hand, to dissolve all the salt cake in order to recover as much of the salt and organic materials as possible. On the other hand, an excess of water would require an undue amount of heat in the final evaporation step. Accordingly, a nearly saturated brine best fulfills the requirements of the invention. The specific gravity of the brine must, however, be carefully controlled as is evident from Table III. If it rises above about 1.19 all the salt can be dissolved only with difficulty. If it falls below about 1.16 decantation becomes very slow and, at still lower values, incomplete. At a specific gravity of around 1.10 inversion of the liquid layers occurs, that is, the dichlorobutane layer comes to equilibrium at the bottom of the decanting apparatus. Since the conventional equipment required in the process is most conveniently set-up for a single mode of operation, inversion is highly undesirable.

The specific gravities shown above are those obtaining at a temperature of around 25° C., the temperature at which dissolution of the salt cake is generally carried out. While filtration can be carried out at this temperature, it proceeds very slowly. Hence a higher temperature is desirable. A source of the adiponitrile lost in the salt cake of the previously used steam stripping process was reaction between dichlorobutane and residual cyanide induced in the cake by the high temperature of the stripping process. Since this reaction becomes appreciable above about 60° C., the temperature must not be increased too much. Preferably, therefore, the filtration temperature is held within the range of about 40–60° C. The optimum temperature is about 50° C. The brine solution may be pre-heated to 40–60° C. when it is made up. If however the specific gravity is taken at any temperature other than 25° C., a correction factor of 0.0004 units degree C. should be applied thereto. This factor is of course negative above 25° C. but positive below. The care necessary in obtaining a correct specific gravity for a given temperature may be illustrated by the fact that the difference between the specific gravity of the brine layer and of the dichlorobutane layer is only about 0.04 units where that of the initial brine emulsion was within the preferred range.

A third factor of importance in carrying out this process is the time required for the filtered brine to separate into discrete layers. As noted above, unless the filtration step is carried out the dichlorobutane will not separate out from the brine. A certain minimum settling time is required however even where filtration is employed. Usually sufficient separation occurs within an hour for decantation to be carried out. Some slight additional separation is obtained when longer settling times are used. A preferred range for the settling time lies between about 1 and 2 hours.

Some variations in the process shown above will be evident. While Wellington Sears 385 nylon filter cloth has, for example, been found to give best filtration results, other nylons, moleskin, or still other filter cloths may be employed. Commercial filter aids other than "Celite" 545 can also be used. Furthermore, the proportions of materials in the original salt cake need not be those shown either in the flow diagram or in the runs set forth. The major constituents of the salt cake will however remain salt and dichlorobutane if the conventional first part of the system is functioning properly. In fact, dichlorobutane may comprise up to about 50% of the total weight of the salt. The percentage of adiponitrile at different stages in the process may also vary widely and depends partly on the temperatures employed since the reaction between cyanide and dichlorobutane is determined by the temperature. Still furthermore the procedure may be applied to other cyanation processes. Consequently I propose to be bound solely by the appended claims.

I claim:

1. A process for purifying a crude, sodium chloride salt cake containing a substantial proportion of dichlorobutane which comprises dissolving the salt cake in water to form a stable emulsion, adjusting the specific gravity of said emulsion to a value between about 1.16 and 1.19 at 25° C., filtering the emulsion, allowing the filtered emulsion to stand until separate aqueous and organic layers form, decanting the separate layers from each other and crystallizing salt from the aqueous layer.

2. The process of purifying a crude, sodium chloride salt cake containing sodium cyanide and a substantial proportion of dichlorobutane which comprises dissolving the salt cake in water to form a stable emulsion, adjusting the specific gravity of the emulsion to a value of about 1.16–1.19 at 25° C., filtering said emulsion at a temperature of 40–60° C., allowing the filtered emulsion to stand until it separates into an upper organic and a lower brine layer, decanting the organic layer from the brine and crystallizing salt from the brine.

3. The process of claim 2 in which the filtration temperature is 50° C.

4. The process of claim 2 in which the brine is acidified with hydrochloric acid and steam-stripped to remove resultant hydrogen cyanide before salt is crystallized therefrom.

5. In the process of preparing adiponitrile in a reaction mixture containing inorganic cyanide, dichlorobutane and a solvent, the steps comprising filtering by-product salt from said reaction mixture, washing the salt with a dichlorobutane wash, dissolving the washed salt in water, adjusting the specific gravity of the resultant stable emulsion to a value of 1.16–1.19 at 25° C., filtering the emulsion at a temperature of 40–60° C., allowing the filtered emulsion to stand until it separates into an upper organic and a lower brine layer, decanting the organic layer from the brine, recycling the decanted organic material to the dichlorobutane wash and further recycling at least part of the dichlorobutane wash to the reaction mixture.

6. The process of claim 5 in which the brine is acidified and steam-stripped to remove hydrogen cyanide therefrom and evaporated to yield purified salt.

7. The method of preparing a usable brine from a crude, sodium chloride salt cake containing sodium cyanide and a substantial proportion of dichlorobutane which comprises sequentially dissolving the salt cake in water to form a stable emulsion therewith, adjusting the specific gravity of the emulsion to about 1.16–1.19 at 25° C., filtering said emulsion, allowing the filtered emulsion to stand until it divides into respective organic and aqueous layers, separating the organic and aqueous layers and acidifying and steam-stripping the separate aqueous layer to remove the cyanide therefrom and thereby produce said brine.

References Cited in the file of this patent

UNITED STATES PATENTS

| | | |
|---|---|---|
| 1,859,140 | Hass et al. | May 17, 1932 |
| 2,222,302 | Schmidt et al. | Nov. 19, 1940 |
| 2,342,101 | Cass et al. | Feb. 22, 1944 |